Figure 1:
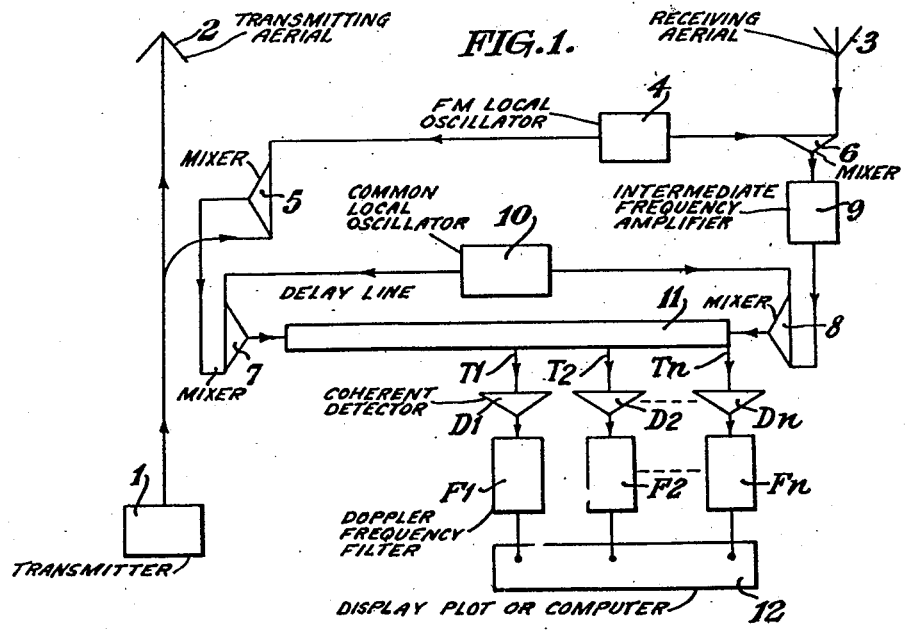

United States Patent Office 2,913,717
Patented Nov. 17, 1959

2,913,717

MOVING TARGET RADAR SYSTEM

Percy Samuel Brandon, Chelmsford, and Peter Maurice Wright, Great Waltham, England, assignors to Marconi's Wireless Telegraph Company Limited, London, England, a British company Application April 21, 1953, Serial No. 350,098

Claims priority, application Great Britain April 29, 1952

6 Claims. (Cl. 343—7.7)

This invention relates to radar systems and more particularly though not exclusively to s-called moving target indicator (M.T.I.) radar systems, that is to say to radar systems for indicating targets which have a component of relative movement towards or away from the system as distinct from targets which are fixed in relation to the said system. The invention is applicable to radar systems whether of the pulsed transmission or of the continuous wave frequency modulated (F.M.) transmission type.

The principal advantages of the invention as applied to M.T.I. radar systems of the pulsed transmission type are that it avoids the difficult necessities, in known M.T.I. systems of this type, of maintaining phase coherence between successive transmissions and between each transmitted pulse and a reference local oscillator and of preventing frequency modulation during each pulse. As applied to M.T.I. systems of the F.M. type the invention offers the advantage of avoiding the necessity for maintaining an inconveniently high degree of linearity of the frequency sweep if good range resolution at long range is to be obtained.

Accurate phase coherence between each transmission and the direct reference signal to the receiver must be maintained in known pulsed M.T.I. systems because the Doppler shift of the carrier frequency (and it is, of course, this shift which is relied upon for moving target selection and indication and also for target velocity measurment per se) is determined by beating echo signals with the direct reference signal. This signal may be provided either by a local oscillator phase locked to each transmission or by a low powered C.W. oscillator which is pulse amplified to provide the pulsed transmissions. In this connection, throughout this specification, the term "echo signal" is used for received signals reflected from a target (or signals, derived therefrom, but shifted in frequency for reasons of convenience) while the term "direct reference signal" is employed for signals transmitted direct from transmitter to receiver without reflection by a target (or signals, derived therefrom, but shifted in frequency for reasons of convenience). Again, in a known pulsed M.T.I. system any frequency modulation which may occur during transmission of a pulse will produce spreading of the Doppler spectrum from moving targets and, moreover, will cause the receiver to produce spurious Doppler notes from fixed targets i.e. beat notes of finite frequency. It is, in practice, most difficult to maintain good phase coherence between the direct reference signal and the transmitted pulse in a pulsed system and to avoid quite substantial frequency modulation during each pulse.

In most known F.M. systems there is the further difficulty that the range resolution, measured as a percentage of the full range of the system, is a function of the degree of linearity of the frequency modulation and this involves that good resolution at long range requires a high degree of linearity of frequency sweep. This also is most difficult to achieve.

According to this invention a radar system comprises means for transmitting signals, means for receiving signals reflected from a target, a delay line of effective length substantially equal to the echo time corresponding to the maximum range for which the system is designed, means for feeding direct reference signals and echo signals to said delay line, a plurality of taps on said delay line at points beyond that at which said line imposes on said direct reference signals a delay equal to one half said echo time, said taps being spaced at intervals equal to one half the range resolution time of the system, a coherent detector fed from each tap, and utilisation means actuated by the detected outputs from the taps. The utilisation means, which form per se no part of this invention may be of any suitable desired form known per se and may be a target display unit, a target plotting device or a target computer device.

In the preferred embodiments of the invention Doppler frequency filters are inserted in the channels from the taps to the utilisation means to select moving targets and enable indication of their speeds to be given but, as will be seen later, the mere existence of a beat frequency output from a tap is an indication of a target at a particular range appropriate to that tap.

The delay line may be of length substantially equal to the echo time for the maximum range for which the system is designed (hereinafter called the maximum echo time) in which case the direct and echo signals are fed in at opposite ends of the line and the taps are spaced along the half of the line nearer the echo signal input end. Alternatively the required delay may be obtained by using a delay line of length equal to half the maximum echo time and which is fully reflecting at one end, in which case the direct and echo signals are fed in at the non-reflecting end, the taps starting at the reflecting end and coming back towards the input end.

Figure 2:
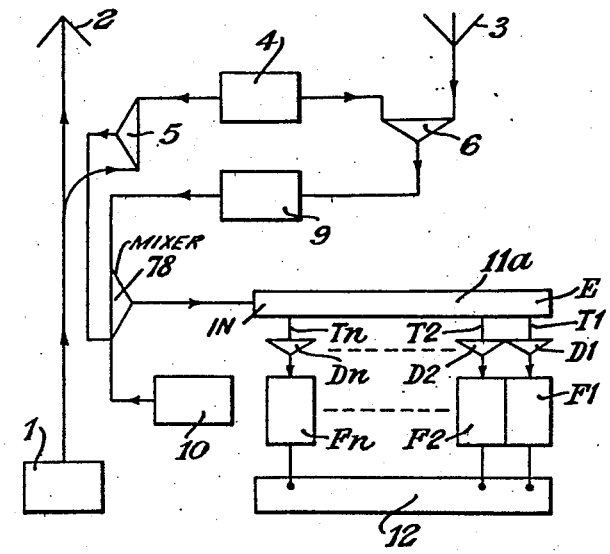

The invention is illustrated in the accompanying drawings in which Figures 1 and 2 are block diagrams respectively showing two embodiments.

Referring to Figure 1 a transmitter 1 which may be either of the pulsed or F.M. type transmits signals from a transmitting aerial 2 and target reflected signals are received upon a receiving aerial 3. Of course, separate transmitting and receiving aerials may be replaced, where desired and suitable, by a common transmitting-receiving aerial and associated transmit-receive box in accordance with well known technique. A common radio frequency local oscillator 4 is associated with both transmission and reception and feeds its oscillations into two mixers 5 and 6. The mixer 5 on the transmitter side receives as its second input signals from the transmitter 1 and the mixer 6 on the receiver side has as its second input signals from the aerial 3. The intermediate frequency outputs from the two mixers 5 and 6 are fed to two further mixers 7 and 8 where the intermediate frequency is reduced to a value suitable for feeding to a delay line. The channel between mixers 6 and 8 includes an intermediate frequency amplifier 9. The second inputs to the mixers 7 and 8 are provided by a common local oscillator 10. The outputs from the mixers 7 and 8 are fed to the opposite ends of a delay line 11 whose overall length is equal to the maximum echo time of the system. This line is tapped over the half nearer the mixer 8. For simplicity in drawing only three of the taps, namely the taps T1, T2 and Tn are shown in the figure. The spacing of successive taps is made equal to half the range resolution time, the last tap Tn being at the end of the line adjacent the mixer 8. Each tap feeds into its own coherent detector (i.e. a mixer) represented conventionally at D1, D2 ... Dn each of which feeds into a Doppler frequency filter F1, F2 ... Fn. The outputs from the filters are fed to any known suitable display, plot or computer apparatus represented by the rectangle 12. Since the taps are spaced at half the range resolution time the number of taps will be the same as the design number of range "elements."

With this arrangement first consider the interaction in the delay line between a signal from the transmitter entering from mixer 7 and an undelayed (i.e. non-reflected) signal entering from mixer 8. These signals will meet at the centre of the line and, in the case of pulse transmission, will produce zero beat there for the duration of each pulse. Assuming a constant carrier frequency the amplitude will remain constant. In the case of F.M. transmission also zero beat of constant level will be produced at the centre of the line. The centre of the line thus corresponds to zero range.

Consider now an echo received from a reflecting target. This will be delayed in reaching the receiver by the echo time and the direct or transmitter signal will meet the echo signal at a point in the line beyond the centre thereof by an amount equal to half the echo time i.e. at a tap whose distance from the line centre is equal to half the echo time. At this point there will be produced a beat frequency which will be of zero frequency in the case of a fixed target or of the Doppler frequency in the case of a moving one. Thus each tap acts as a range gate for a different range and there will be obtained at each tap a Doppler frequency from any target whose range is such as to give an echo time equal to twice the delay time between the centre of the line and the tap in question. Accordingly the range of any echoing target is given by the tap at which the beat frequency appears and the frequency itself is a function of the speed of the target towards or away from the system.

The modification shown in Figure 2 differs from that of Figure 1 in that the length of the line, here given the reference 11a, is half the maximum echo time and is made as nearly as possible perfectly reflecting at one end E. Direct and echo signals are applied at the other end In from a mixer unit 78 fed as indicated. In this system the direct or transmitter signal travels along the line to the reflecting end E and, on its way back, will meet the outgoing echo signal (which has been delayed by the amount of the echo time) at a tap determined by the range of the echoing target. This system requires that the maximum echo time shall be less than half the transmitter repetition period otherwise difficulties will be caused by reflections of echo signals from the reflecting end of the line for such signals must return to the input end In of the line and be absorbed before the next transmission. On the other hand the system requires only half the length of line required in the system of Figure 1.

As will be appreciated both the systems illustrated do not require phase coherence in the transmitter; in the case of pulse working they are insensitive to frequency or phase modulation during the pulse and automatic range gating is obtained; and in the case of a F.M. working they are insensitive to non-linearity of the transmitted frequency sweep and continuous determination of range is obtained without scanning or gating.

We claim:

1. A radar system comprising means for transmitting signals, means for receiving signals reflected from a target, a delay line of effective length substantially equal to the maximum echo time, means for feeding direct reference signals and echo signals to said delay line, a plurality of taps on said delay line, said taps extending over the portion of said line beyond the point at which said line imposes on said direct reference signals a delay equal to one half said maximum echo time, said taps being spaced at intervals equal to one half the range resolution time of the system, a coherent detector fed from each tap, and utilisation means actuated by the separated detector outputs from the coherent detectors.

2. A system as claimed in claim 1 wherein the separated detector outputs are fed to Doppler frequency filters respectively connected in series between the coherent detectors and the utilisation means to select moving targets.

3. A system as claimed in claim 1 wherein the electrical length of the delay line measured from end to end is substantially equal to the maximum echo time and the direct and echo signals are fed in at opposite ends of the line and the taps are spaced along the half of the line nearer the echo signal input end.

4. A system as claimed in claim 1 wherein the electrical length of the delay line measured from end to end is substantially equal to half the maximum echo time, said line having a reflective termination at one end, and the direct and echo signals are fed in at the non-reflecting end, the taps starting at the reflecting end and coming back towards the input end.

5. A system as claimed in claim 1 wherein the electrical length of the delay line measured from end to end is substantially equal to the maximum echo time and the direct and echo signals are fed in at opposite ends of the line and the taps are spaced along the half of the line nearer the echo signal input end, said system including a first local oscillator, a first pair of mixers, means for mixing local oscillations from said first local oscillator with transmitted signals in one of said pair of mixers and echo signals in the other of said pair of mixers, a second local oscillator, a second pair of mixers, means for mixing oscillations from said second local oscillator in one of said second pair of mixers with the output from one of said first pair of mixers, means for mixing oscillations from said second local oscillator in the other of said second pair of mixers with the output from the other of said first pair of mixers, means for feeding the delay line at one end with the output from said one of said second pair of mixers and at the other end with the output from said other of said second pair of mixers, the taps on said line being spaced at half the range resolution time between the middle of said delay line and the end thereof which is fed from said other of said second pair of mixers, and channels each including one of said detectors followed by a Doppler frequency filter, between said taps and said utilisation means.

6. A system as claimed in claim 1 wherein the electrical length of the delay line measured from end to end is substantially equal to half the maximum echo time, said line having a reflective termination at one end, and the direct and echo signals are fed in at the non-reflecting end, the taps starting at the reflecting end and coming back towards the input end said system including a first local oscillator, a first pair of mixers, means for mixing local oscillations from said first local oscillator with transmitted signals in one of said pair of mixers and echo signals in the other of said pair of mixers, a second local oscillator, a further mixer, means for mixing oscillations from said second local oscillator with the outputs from the first pair of mixers in said further mixer, means for feeding the delay line at one end with the output from said further mixer, the taps on said line being spaced at half the range resolution time along said delay line, and channels each including one of said detectors followed by a Doppler frequency filter, between said taps and said utilisation means.

References Cited in the file of this patent
UNITED STATES PATENTS 2,410,233    Percival _____ Oct. 29, 1946